(12) United States Patent
Tran et al.

(10) Patent No.: US 7,295,400 B2
(45) Date of Patent: Nov. 13, 2007

(54) METHOD AND APPARATUS FOR MECHANICALLY BALANCING THE DISK PACK OF A HARD DISK DRIVE

(75) Inventors: Gregory Tran, Santa Clara, CA (US); Ed Aguilar, San Jose, CA (US); Shiao-Hua Chen, Palo Alto, CA (US); Woo-Sung (William) Kim, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/471,777

(22) Filed: Jun. 20, 2006

(65) Prior Publication Data
US 2006/0230600 A1 Oct. 19, 2006

Related U.S. Application Data

(62) Division of application No. 10/657,587, filed on Sep. 8, 2003, now Pat. No. 7,064,923.

(60) Provisional application No. 60/413,734, filed on Sep. 25, 2002.

(51) Int. Cl.
*G11B 17/02* (2006.01)

(52) U.S. Cl. .................................................. 360/99.08
(58) Field of Classification Search ................... None
See application file for complete search history.

(56) References Cited

U.S. PATENT DOCUMENTS

| 4,823,218 | A | * | 4/1989 | Ibe et al. | 360/271.1 |
| 5,422,776 | A | * | 6/1995 | Thorson et al. | 360/98.07 |
| 6,158,112 | A | * | 12/2000 | Kim et al. | 29/759 |
| 2002/0067569 | A1 | * | 6/2002 | Choo et al. | 360/98.08 |
| 2002/0191332 | A1 | * | 12/2002 | Elsing | 360/99.08 |

* cited by examiner

*Primary Examiner*—William R. Korzuch
*Assistant Examiner*—Mark Blouin
(74) *Attorney, Agent, or Firm*—Earle Jennings; GSS Law Group

(57) ABSTRACT

The invention includes a method making a balanced disk pack for a hard disk drive, from a disk pack including a spindle motor rigidly coupled, and aligned by at least two open screw holes, with a disk clamp. The invention includes the resulting balanced disk packs, as well as hard disk drives built with such balanced disk packs. The invention also includes apparatus providing the means for implementing the steps of making a balanced disk pack from a disk pack. The invention includes at least one mechanical counterbalance for use in balancing the disk pack of a hard disk drive.

9 Claims, 13 Drawing Sheets

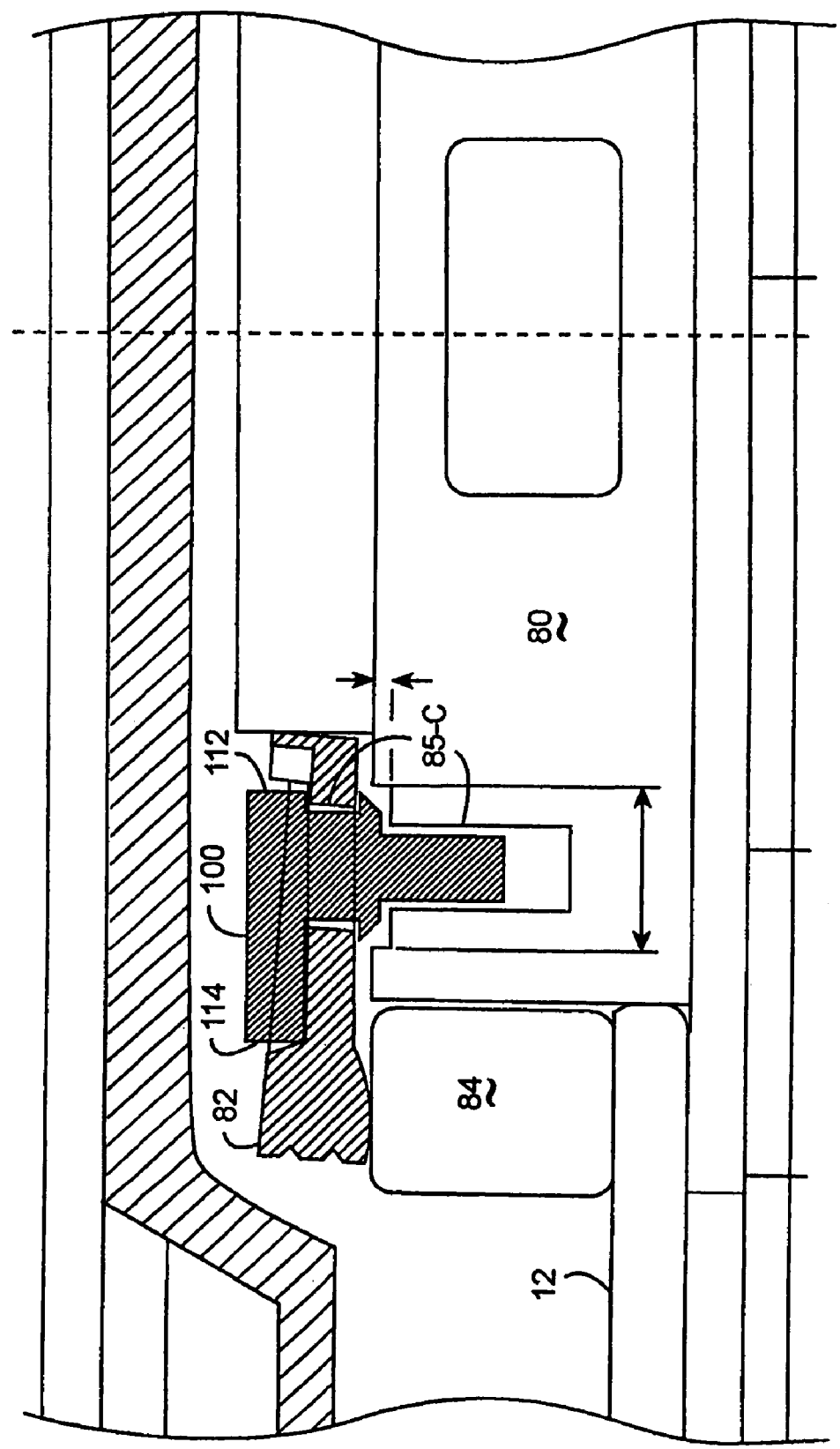

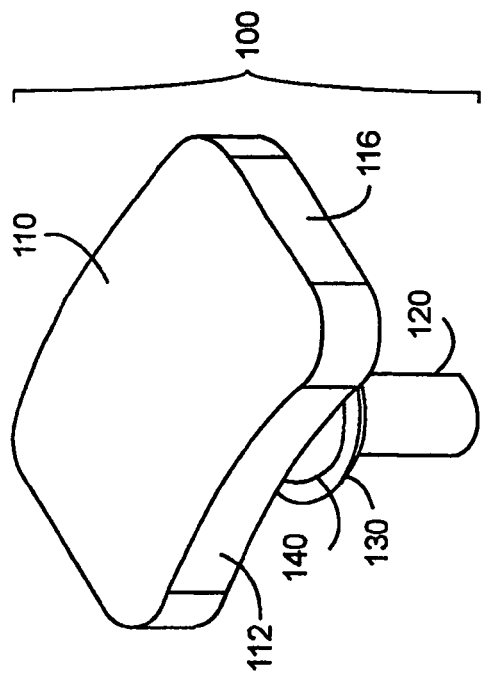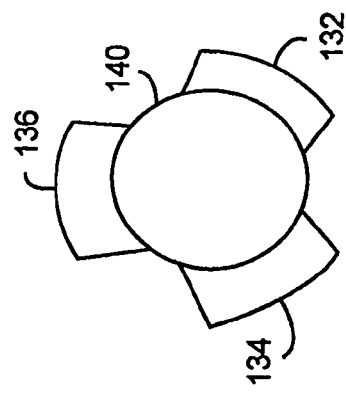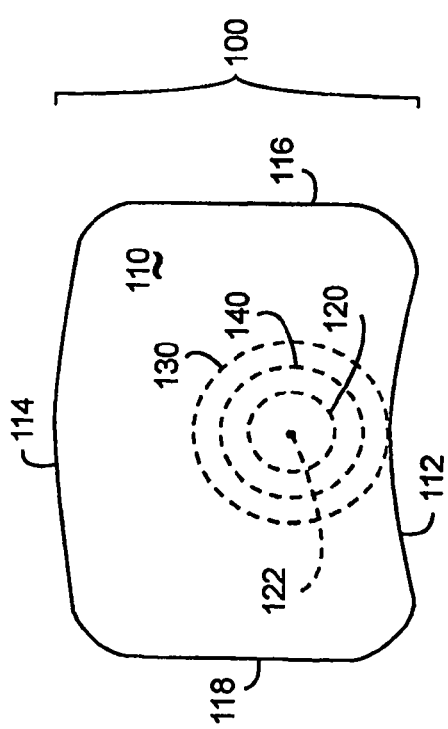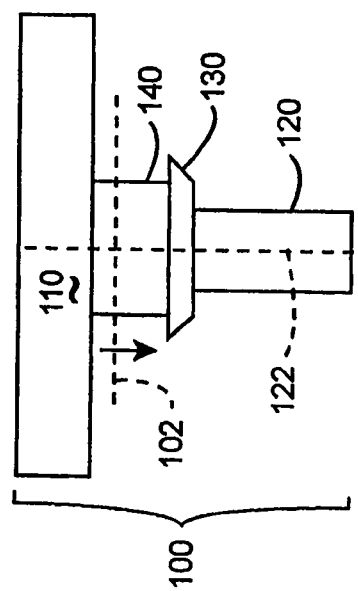
Fig. 5A
Fig. 5B
Fig. 5C
Fig. 5D

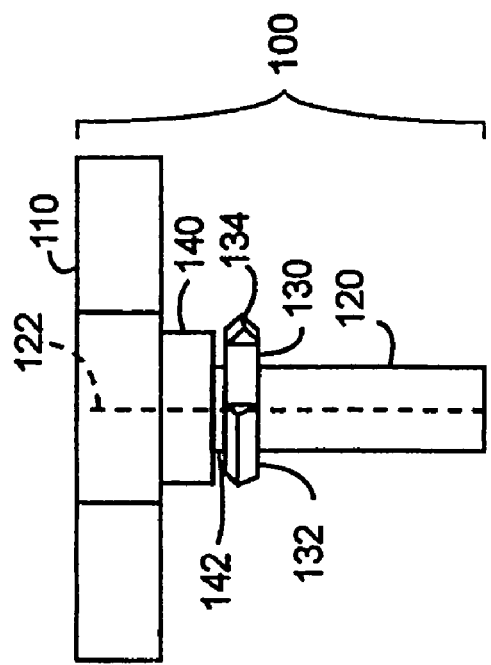
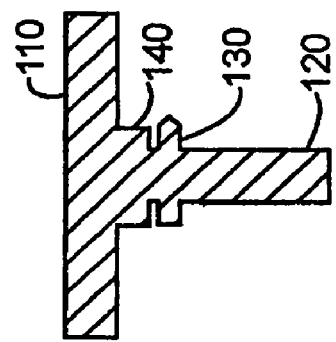
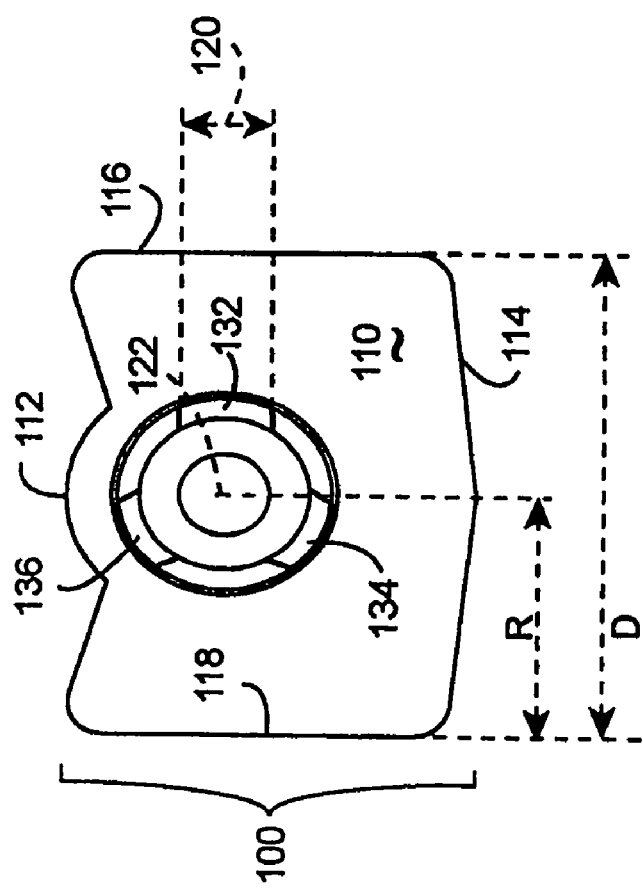

METHOD AND APPARATUS FOR MECHANICALLY BALANCING THE DISK PACK OF A HARD DISK DRIVE

CROSS REFERENCE TO RELATED APPLICATIONS

This application is a divisional application of patent application Ser. No. 10/657,587 filed Sep. 8, 2003 now U.S. Pat. No. 7,064,923 which further claims the benefit of the priority date of U.S. provisional patent application Ser. No. 60/413,734, filed Sep. 25, 2002, the specification of which is hereby incorporated in its entirety.

BACKGROUND OF THE INVENTION

1. Field of the Invention

The present invention relates to mechanically balancing the disk pack in a hard disk drive.

2. Background Information

Hard disk drives contain a plurality of magnetic heads coupled to rotating disks. The disk pack rotates the disk surfaces in a hard disk drive. Imbalances in the disk pack adversely affect communication to and from the rotating disk surfaces. Therefore, disk packs must be balanced to minimize rotational variation at the disk surfaces.

The typical prior art disk pack includes a spindle motor, one or more disks, possibly one or more spacers, and a disk clamp. Bolts or screws couple the disk clamp to the spindle motor, acting to clamp the disk(s) and spacers into a rigidly coupled assembly which is rotated by the spindle motor during operation.

Making disk packs includes a rotational balancing process, which mechanically aligns the disk packs by attaching counterbalances. A typical balance tolerance for a disk pack is a variation in angular momentum of 35 milligram-centimeters, as measured by a balance calibration system.

There are several existing approaches to balancing disk packs based upon different counterbalances. These existing approaches have created problems, which have added to the cost of production and/or diminished the reliability of the produced hard disk drives.

A first prior art balancing approach involves altering a symmetric ring coupled to a disk clamp. Cutting, drilling, or punching are used to alter the ring.

A second approach involves drilling one or more holes in either the disk clamp or the spindle motor hub. The spindle motor hub is a spindle motor region containing the screw holes used to couple with the disk clamp when making the disk pack. Machining holes in the disk clamp or the spindle motor hub may introduce contaminants such as machine tailings and machine oils. Furthermore, the machining required is specific to the particular disk pack and must meet narrow tolerances, making this approach expensive.

A third approach involves injecting glue and/or heat sealing plastic at selected spots, and in selected amounts, near the disk clamp to counterbalance the disk pack. This injection releases contaminants, which require cleaning procedures to restore the cleanliness of the disk system when assembled. The injected compounds also require a specific environment in order to harden correctly, further adding cost, and often delays, until the hardening process is completed.

Accordingly, what is needed are counterbalances, and methods of balancing disk packs using such counter balances, which do not require unit specific machining and which do not create contamination problems.

BRIEF SUMMARY OF THE INVENTION

The present invention includes methods of making a balanced disk pack from a disk pack that may have previously been unbalanced. The invention also includes the balanced disk packs resulting from balancing the disk packs, as well as the hard disk drives built with such balanced disk packs. The invention further includes the apparatus making a balanced disk pack from a disk pack.

The disk pack typically includes a spindle motor rigidly coupled with a disk clamp, and aligned by at least two open screw holes. The disk pack balancing methods use no unit-specific machining operations. Using cleaned counterbalances minimizes contamination, which may eliminate the cost and production delays of glues and injected plastics.

The invention includes at least one mechanical counterbalance for balancing a disk pack. The mechanical counterbalance fits into an open screw hole, and locks against a locking plate collection member. The locking plate collection typically includes the disk clamp and the spindle motor.

The disk clamp may be the preferred locking plate collection member, because if the disk pack with locked mechanical counterbalances fails to balance, disassembling can salvage at least the spindle motor and disks.

Preferred mechanical counterbalances include a cylindrical shaft rigidly coupled to a latching assembly and a balance weight. The cylindrical shaft centers around a primary axis. The latching assembly includes a compressible latch rigidly coupled to a latch gap zone. The balance head rigidly couples to the latch gap zone. The latching assembly, including the compressible latch, and the latch gap zone, center around the primary axis.

The invention includes selecting a counterbalance from a counterbalance type collection of at least two counterbalances with total masses, which are different or distinct. Such counterbalances will be referred to as distinct total masses.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 4 shows a more detailed view of the cross-section of FIG. 2;

FIG. 5A shows a top cross-sectional view of a mechanical counterbalance of FIGS. 1 to 4;

FIG. 5B shows a perspective view of the mechanical counterbalance of FIGS. 1 to 5A;

FIG. 5C shows a side view of the mechanical counterbalance of FIGS. 1 to 5B;

FIG. 5D shows the view along a cut line of the fins of FIG. 5C;

FIG. 6A shows a top cross-sectional view of a second preferred mechanical counterbalance which could be used in FIGS. 1-4;

FIG. 6B shows a side view of the second mechanical counterbalance of FIG. 6A;

FIG. 6C shows a side cross-sectional view of the second mechanical counterbalance of FIGS. 6A-6B;

DESCRIPTION OF THE PREFERRED EMBODIMENTS

Figure 1:
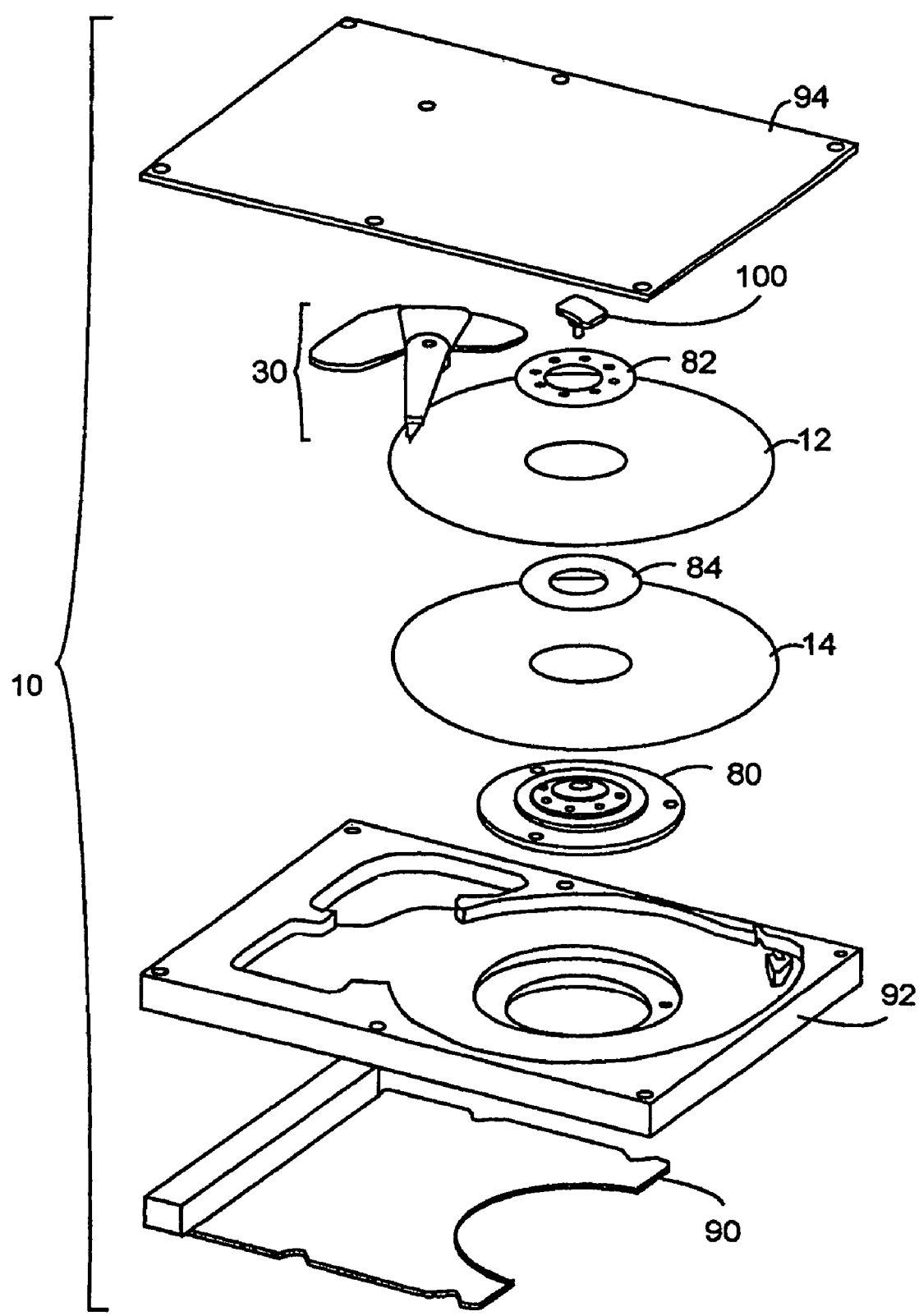
FIG. 1 shows an exploded schematic view of a balanced disk pack in a hard disk drive.

The following description is provided to enable any person skilled in the art to make and use the invention and sets forth the best modes presently contemplated by the inventors for carrying out the invention. Various modifications, however, will remain readily apparent to those skilled in the art, since the generic principles of the present invention have been defined herein.

The invention includes using at least one mechanical counterbalance 100 for balancing a disk pack of a hard disk drive as shown in FIGS. 1 to 4. FIGS. 1 to 4 show a disk pack. A disk pack includes a spindle motor 80 and at least one disk 12 rigidly coupled with the disk clamp 82. The disk pack is aligned by at least two open screw holes 85-A and 85-B. Disk packs may further include disk spacers 84. Open screw holes 85-A and 85-B are shown only in FIG. 4.

FIG. 1 shows an exploded schematic view of a hard disk drive 10, including a balanced disk pack employing a preferred mechanical counterbalance 100. The hard disk drive 10 also includes the following. A hard disk drive base plate 90, a hard disk drive base 92, a second disk 14, separated by a disk spacer 84, a voice coil actuator 30, and the hard disk drive cover 94.

Figure 2:
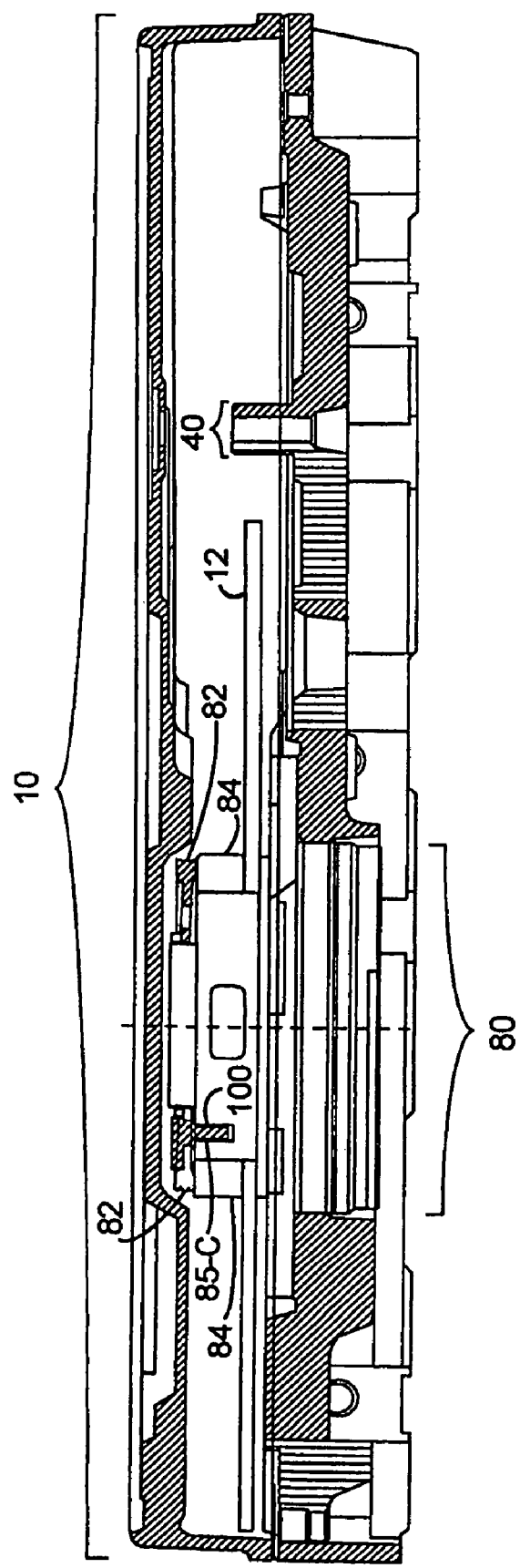
FIG. 2 shows a side cross-sectional view of the disk pack in the hard disk drive of FIG. 1.

FIG. 2 shows a side cross-sectional view of hard disk drive 10 with the mechanical counterbalance 100 of FIG. 1 inserted into open screw hole 85-C of the disk pack, at least partially creating the balanced disk pack.

Figure 3:
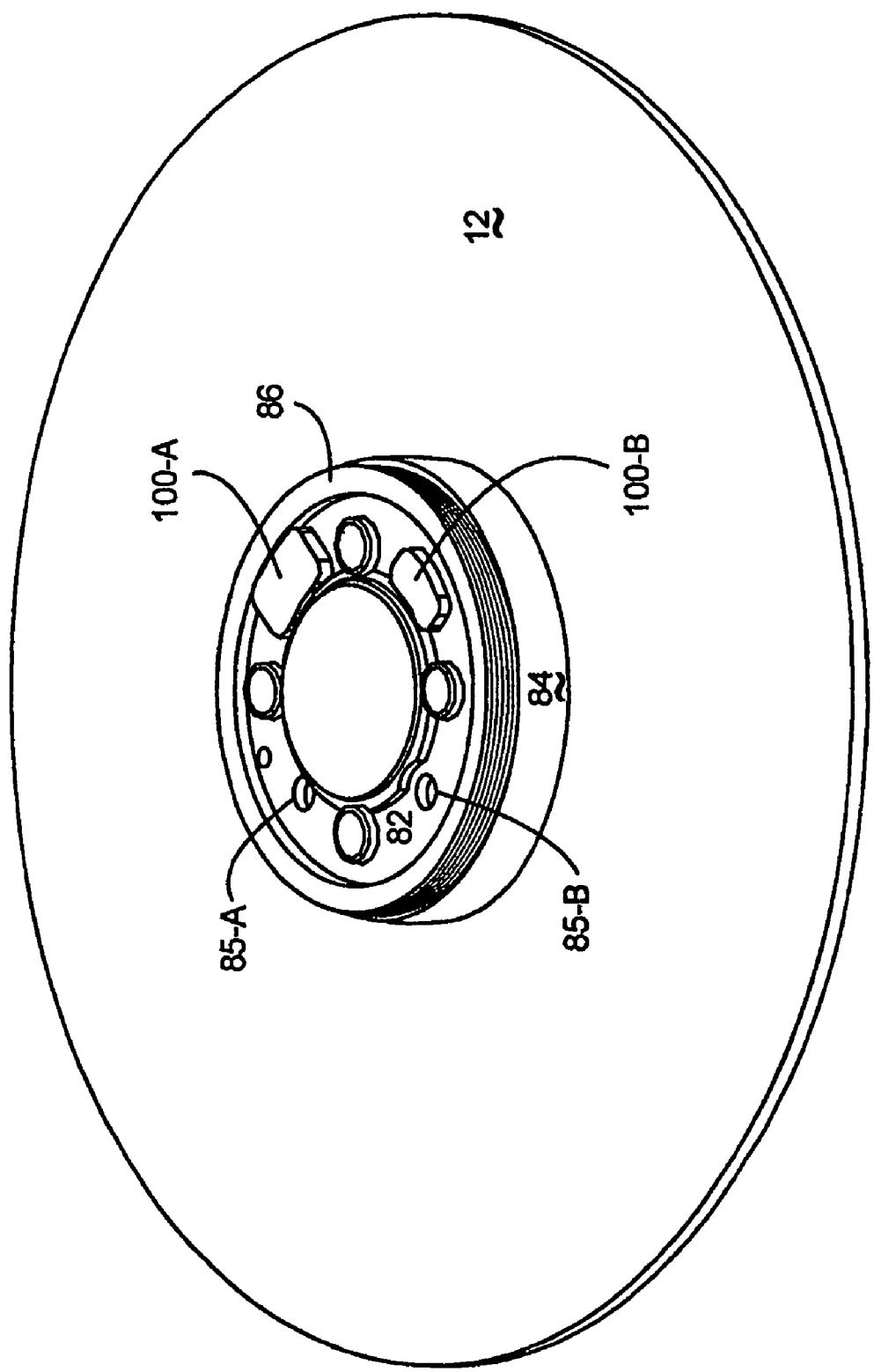
FIG. 3 shows a perspective view of the disk pack of FIGS. 1 and 2.

FIG. 3 shows a perspective view of the balanced disk pack of FIGS. 1 and 2. Two mechanical counterbalances 100-A and 100-B are inserted into two open screw holes in disk clamp 82. The Figure also includes a disk ring 86, disk spacer 84, and disk 12.

FIG. 4 shows a magnified view of a portion of the cross-section of FIG. 2. The mechanical counterbalance 100 is shown locking against the disk clamp 82. When fitted into the open screw hole 85-C, the mechanical counterbalance 100 aligns with both the disk clamp 82 and the spindle motor 80.

The mechanical counterbalance 100, in FIGS. 2 and 4, includes means for fitting into the open screw hole, and locking against a locking plate collection member.

The locking plate collection of FIGS. 1 to 4 includes the disk clamp 82 and the spindle motor 84. The locking plate collection may also include the disk spacer 84 coupled between the disk clamp 82 and the spindle motor 80.

Typically, disk spacers do not include screw holes, thus the disk spacers 84, of FIGS. 1 to 4, may or may not include screw holes. In hard disk drives possessing more than one disk, the disk pack further includes one or more additional disk spacers 84, as seen in FIG. 1. A disk pack may also include disk spacer 84 in hard disk drives using just one disk 12, as in FIGS. 2, 3 and 4.

FIGS. 5A to 6C show various embodiments of the mechanical counterbalances 100 of FIGS. 1 to 4.

The mechanical counterbalance 100 in FIGS. 5A to 5C includes a compressible latch 130 as a compressible ridge ring. FIGS. 5A, 5B and 5C show a top cross-sectional view, a perspective view, and a side view of the mechanical counterbalance 100 of FIGS. 1 to 4.

The mechanical counterbalances 100 of FIGS. 5A to 6C include a cylindrical shaft 120 rigidly coupled to a latching assembly 130 to 140 and a balance weight 110. The cylindrical shaft 120 is centered around a primary axis 122. The latching assembly 130 to 140 is also centered around primary axis 122. The latching assembly 130 to 140 includes a compressible latch 130 rigidly coupled to latch gap zone 140. The balance head 110 rigidly couples to the latch gap zone 140.

The compressible latch 130 in FIGS. 5D to 6C is a ring of three compressible fins. FIG. 5D shows the view along cut line 102, of FIG. 5C, for the fins 132, 134, and 136. FIG. 6A, 6B and 6C show top cross-sectional, side, and side cross-sectional views of a preferred mechanical counterbalance 100. The compressible latch 130 may include two or more fins.

The mechanical counterbalance 100 of FIGS. 5A to 6C may be primarily composed of one material formed into the cylindrical shaft 120, the latching assembly 130 to 140 and the balance weight 110. The material may essentially be a castable material, such as plastic. The plastic may preferably be a version of nylon. In alternate embodiments, the counterbalance 100 maybe formed of several different materials.

The mechanical counterbalance 100 may preferably be free of contaminants. Example contaminants include a particle larger than a first specification, a hanging burr larger than a second specification, and a contaminant determined by a third specification. Each of these specifications is derived from a reliability specification used in the manufacturing of the hard disk drive.

The balance weight 110 of FIGS. 5A to 6C includes an interior face 112, exterior face 114, and side faces 116 and 118.

Mechanical counterbalance 100 has a total mass at essentially the primary axis 122 (FIGS. 5A, 5B, 6A, and 6B) when balancing the disk pack. Mechanical counterbalance 100 preferably balances the disk pack by fitting the primary axis 122 through the center of the open screw hole 85-C.

As in FIGS. 2 and 3, the following occurs when inserting the mechanical counterbalance 100 of FIGS. 5A to 6C into an open screw hole of the disk pack. The cylindrical shaft 120 fits into the open screw hole. The compressible latch compresses while passing through the screw hole, and expands after passing through the screw hole to lock the mechanical counterbalance 100 against a locking plate collection member.

FIGS. 5A-6C also show the following. The means 120 for fitting mechanical counterbalance 100 into at least one open screw hole 85. The means for locking mechanical counterbalance 100 into the open screw hole against a locking plate collection member, after fitting mechanical counterbalance 100 into the open screw hole 85. The means for locking includes the compressible latch 130, the latch gap zone 140, and the balance head 110.

Figure 7:
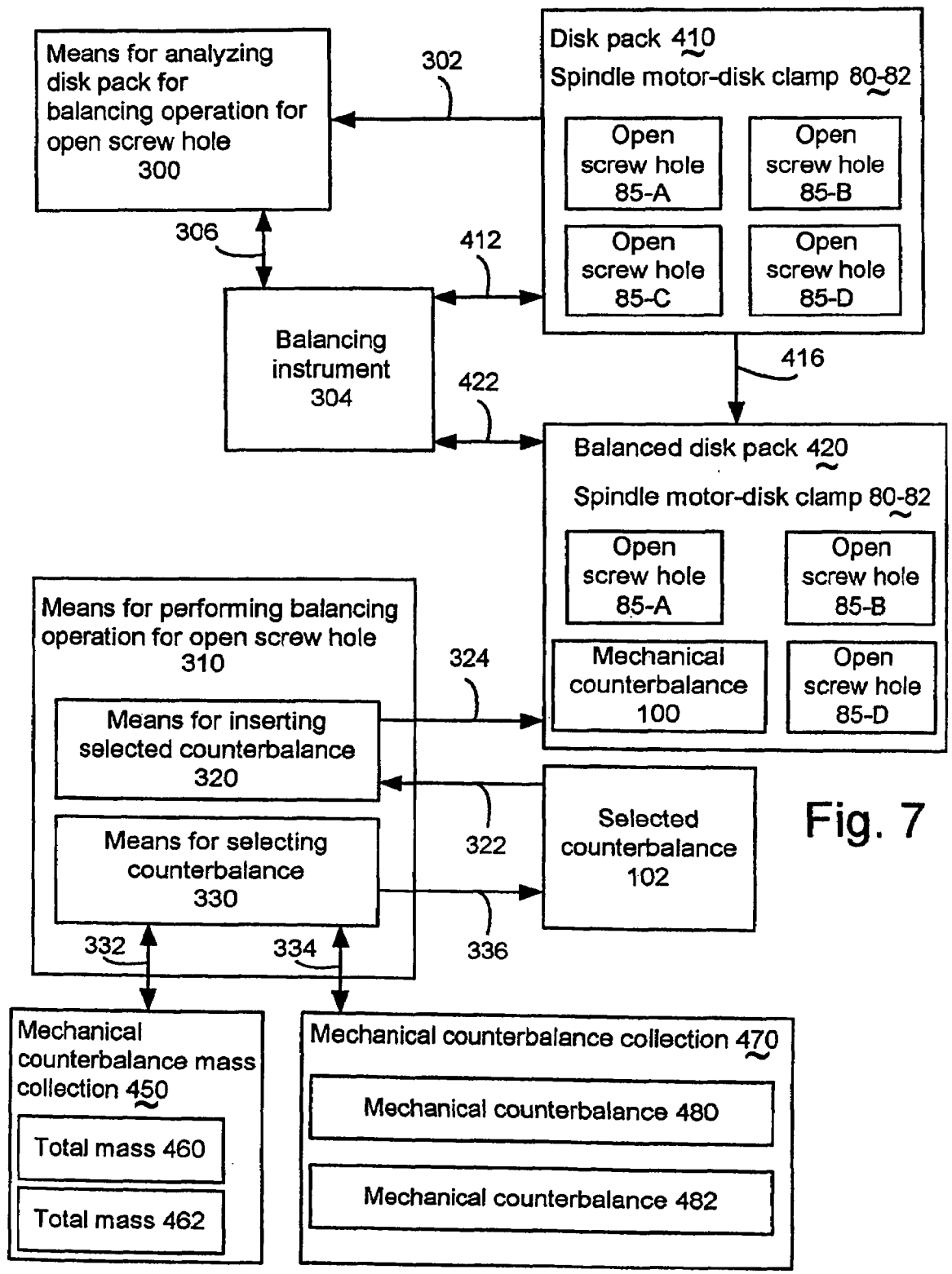
FIG. 7 shows an apparatus for making a balanced disk pack from a disk pack.
Figure 8:
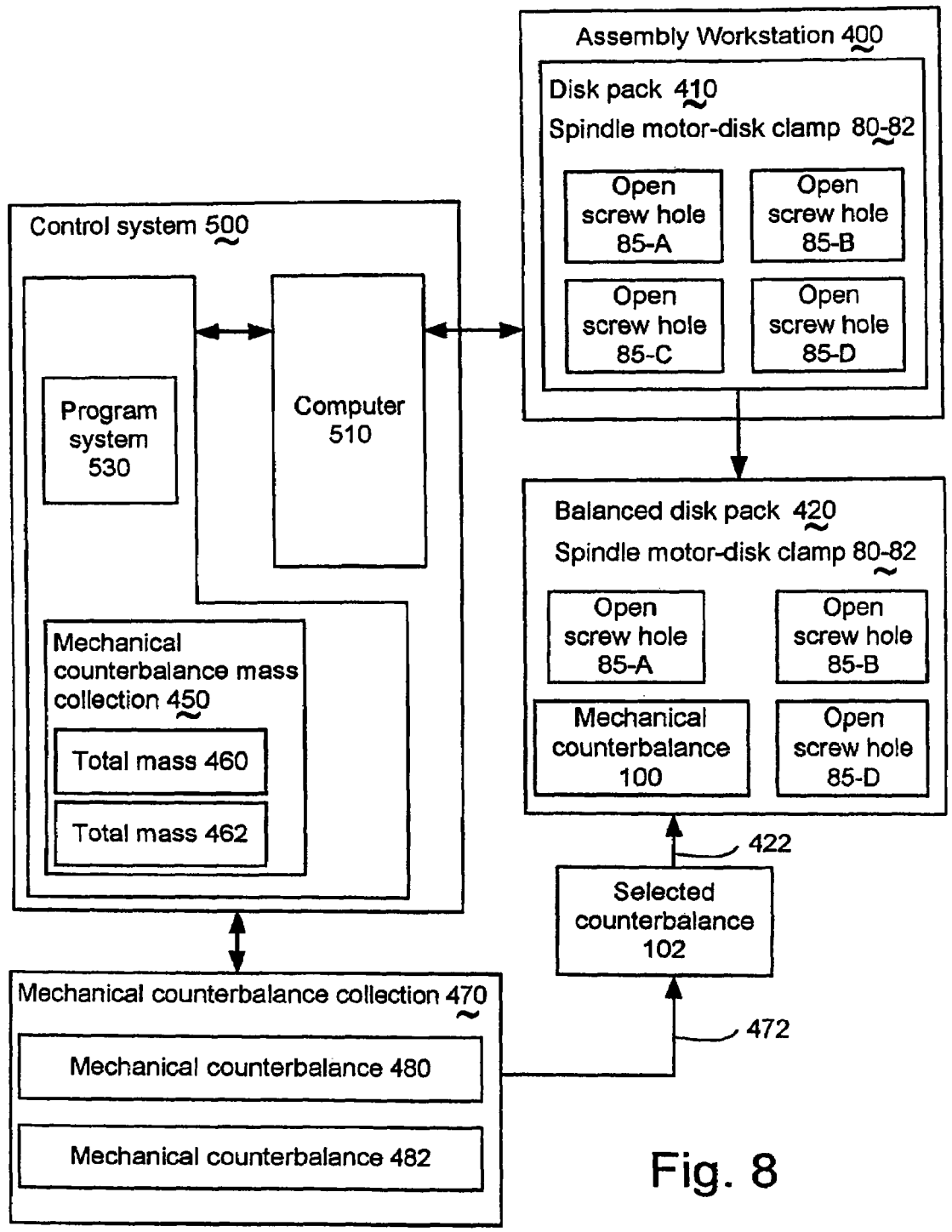
FIG. 8 shows a preferred apparatus for making the balanced disk pack as in FIG. 7.

FIGS. 7 and 8 show two embodiments supporting the invention's balancing method for disk packs.

The invention includes a method of balancing a disk pack involving selecting a mechanical counterbalance from a counterbalance type collection. The counterbalance type collection comprises at least two counterbalances, each with a distinct total mass. In experiments by the inventors, two counterbalances had total, preferred masses of about 24 mg and 54 mg.

FIG. 7 shows an apparatus for making a balanced disk pack 420 from a disk pack 410. The disk pack 410 includes a spindle motor 80 rigidly coupled with a disk clamp 82. The spindle motor 80 aligns with the disk clamp 82 by at least two, and preferably four, open screw holes 85-A to 85-D.

FIG. 8 shows a preferred apparatus for making a balanced disk pack 420 from a disk pack 410 as in FIG. 7. The method uses an assembly workstation 400 controlled by a computer executing a program system 530 of program steps residing in memory 520.

The mechanical counterbalance mass collection 450 includes at least two members 460 and 462. The mechanical counterbalance mass collection members are the distinct total masses of the types 480 and 482 of the mechanical counterbalance type collection, as in FIGS. 7 and 8.

As shown in FIG. 7, arrows 324 and 422 preferably represent means for inserting the selected counterbalance 102 into the screw hole.

Discussion of making balanced disk packs hereafter will be in terms of the flowcharts of program system 530 of FIG. 8. This simplifies the discussion, and is not meant to limit the scope of the claims. FIGS. 9A to 13B show the method of balancing a disk pack, using the invention's mechanical counterbalance.

The following flowcharts of the methods of the invention possess arrows with reference numbers. These arrows signify flow of control, and sometimes data. The arrows support implementations including at least one program step, or program thread, executing upon a computer, inferential links in an inferential engine, state transitions in a finite state machine, or learned responses within a neural network.

The operation of starting a flowchart refers to at least one of the following. Starting may refer to entering a subroutine in a macro instruction sequence in a computer. Starting may refer to entering into a deeper node of an inferential graph. Starting may refer to directing a state transition in a finite state machine, possibly while pushing a return state. Starting may refer to triggering a collection of neurons in a neural network.

The operation of termination in a flowchart refers to the completion of operations. It may result in a subroutine return, traversal to a higher node in an inferential graph, popping of a previously stored state in a finite state machine, and/or return to dormancy of firing neurons in a neural network.

A computer as used herein will include, but is not limited to, an instruction processor. The instruction processor includes at least one instruction processing element and at least one data processing element, each data processing element controlled by at least one of the instruction processing elements.

Figure 9A:
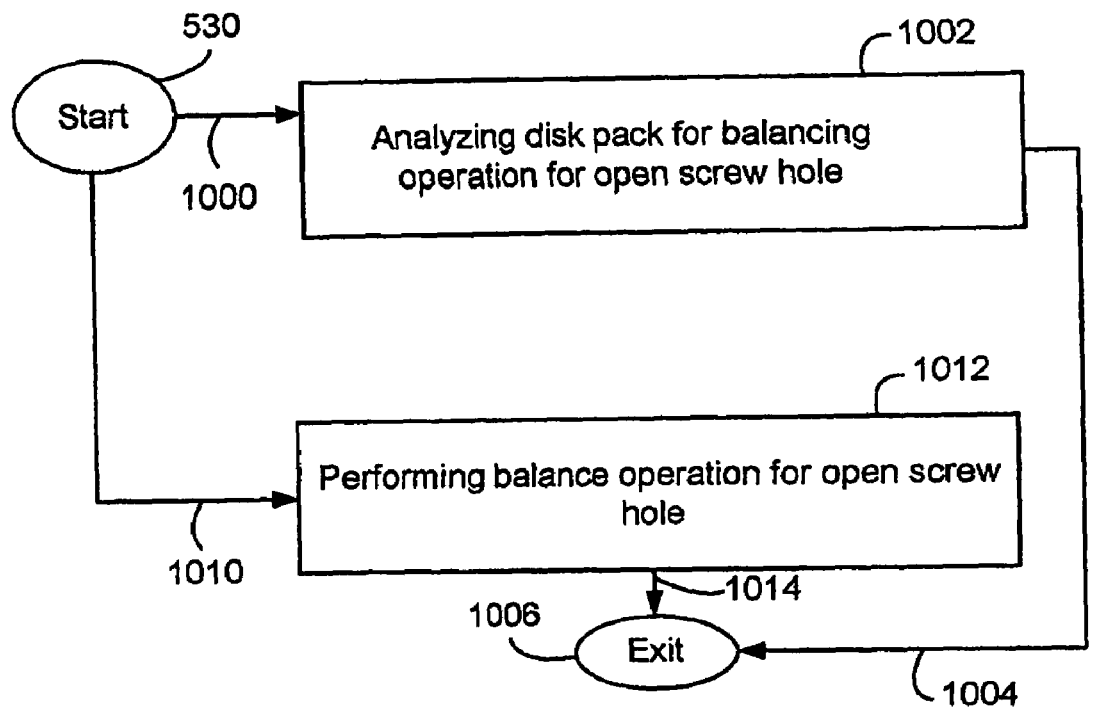
FIG. 9A shows a detail of the program system of FIG. 8.

FIG. 9A shows a program system 530 of FIG. 8 for making the balanced disk pack 420 from the disk pack 410, for each of the open screw holes 85. Operation 1002 analyzes the disk pack 410 for a balancing operation for the open screw hole. Operation 1012 performs the balance operation for the open screw hole.

Figure 9B:
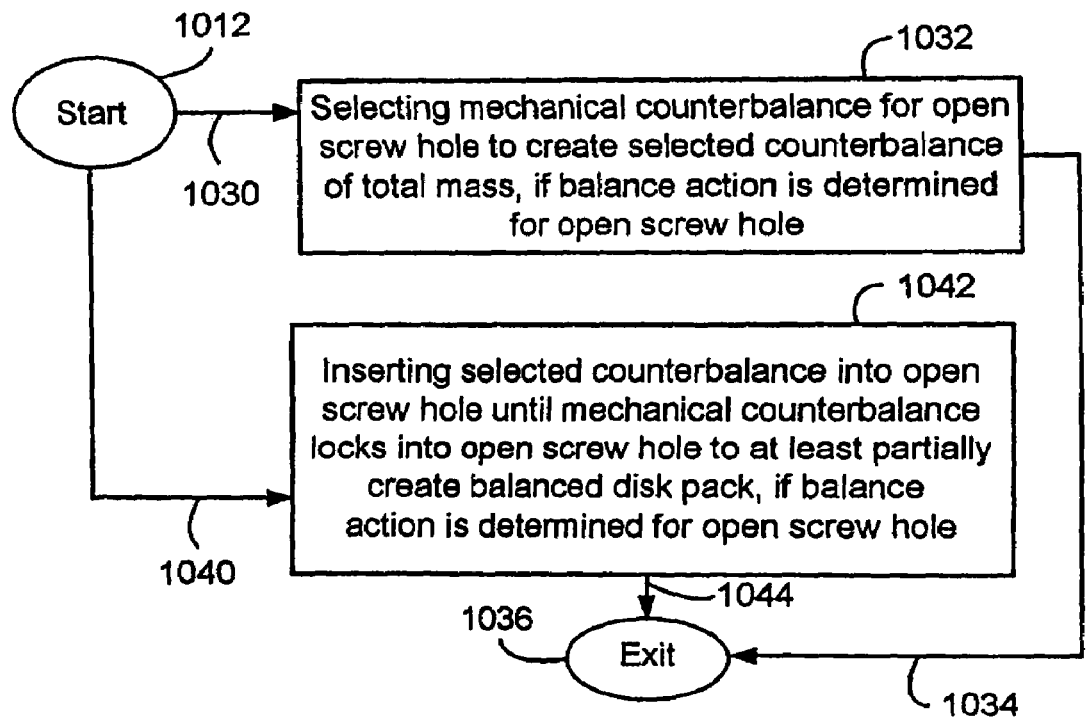
FIG. 9B shows a detail performing the balance operation for the open screw hole of FIG. 9A.

FIG. 9B shows a detail of operation 1012 of FIG. 9A, if a balance action is determined for the open screw hole. Operation 1032 selects a mechanical counterbalance for the open screw hole to create a selected counterbalance 102 of a total mass. Operation 1042 inserts the selected counterbalance 102 into the open screw hole, until the selected counterbalance locks into the open screw hole, at least partially creating the balanced disk pack.

Figure 10A:
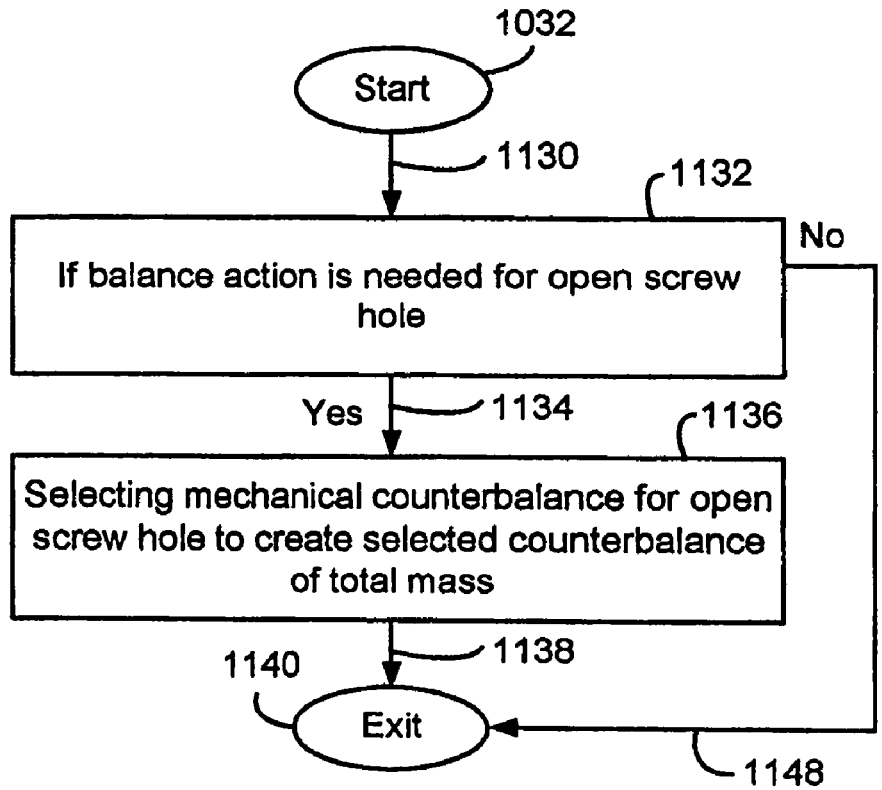
FIG. 10A shows a detail selecting a mechanical counterbalance for the open screw hole of FIG. 9B.
Figure 10B:
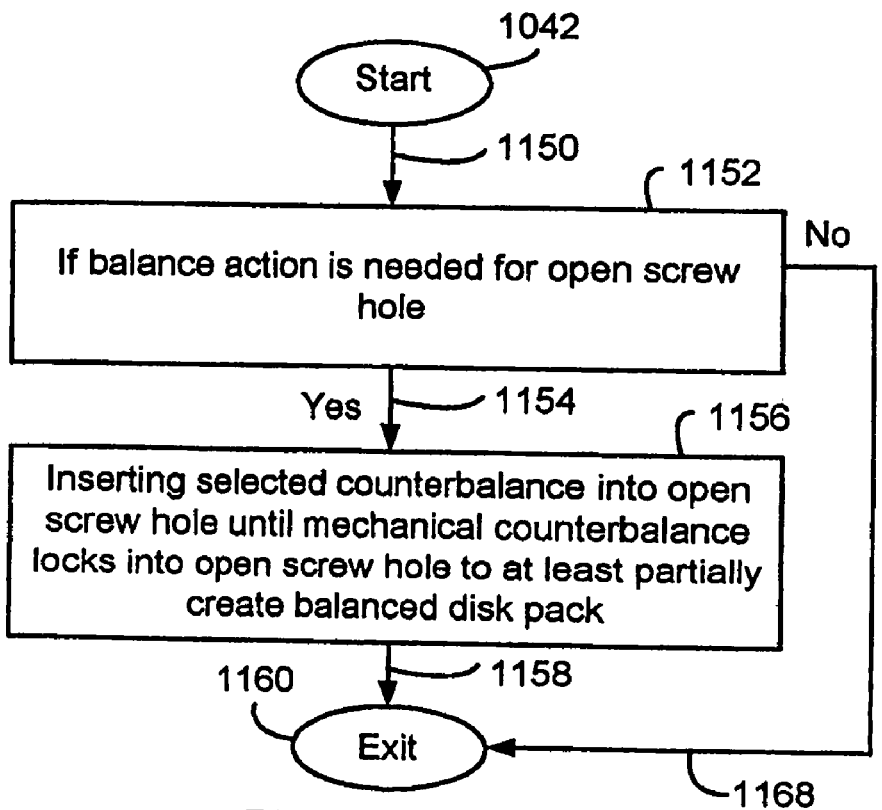
FIG. 10B shows a detail of inserting the selected counterbalance into the open screw hole until the mechanical counterbalance locks into the open screw hole of FIG. 9B.

FIGS. 10A and 10B show one of several possible, equivalent implementations of the operations of FIG. 9B, including implementations with a shared test.

FIG. 10A shows a detail of operation 1032 of FIG. 9B. Operation 1132 determines if a balance action is needed for the open screw hole. When the determination 1134 is Yes, operation 1136 selects a mechanical counterbalance for the open screw hole to create a selected counterbalance 102 of a total mass.

FIG. 10B shows a detail of operation 1042 of FIG. 9B. Operation 1152 determines whether the open screw hole needs a balance action. When the determination 1154 is Yes, operation 1156 inserts the selected counterbalance 102 into the open screw hole until the selected counterbalance 102 locks into the open screw hole at least partially creating the balanced disk pack.

Figure 11A:
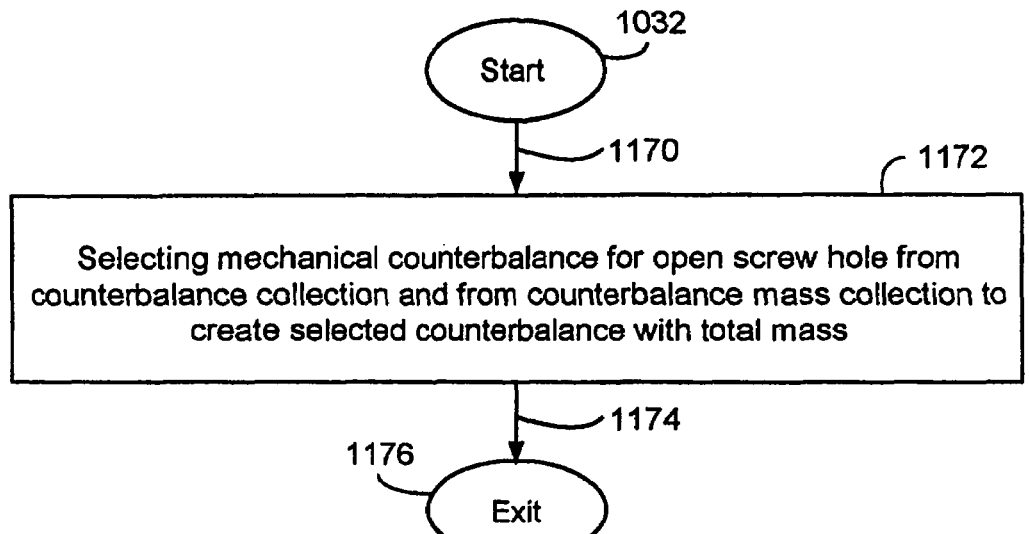
FIG. 11A shows a detail of selecting the mechanical counterbalance for the open screw hole of FIG. 9B.

FIG. 11A shows a detail of operation 1032 of FIG. 9B. Operation 1172 selects the mechanical counterbalance for the open screw hole from the counterbalance collection 470 and from the counterbalance mass collection 450, creating the selected counterbalance 102 with the total mass, as shown in FIGS. 8 and 9.

In FIGS. 7 to 11A, the selected counterbalance 102 is an instance of a member of the mechanical counterbalance collection 470.

The arrows in FIGS. 7 and 8 pointing to and pointing from the selected counterbalance 102 preferably represent assembly feed mechanisms.

Figure 11B:
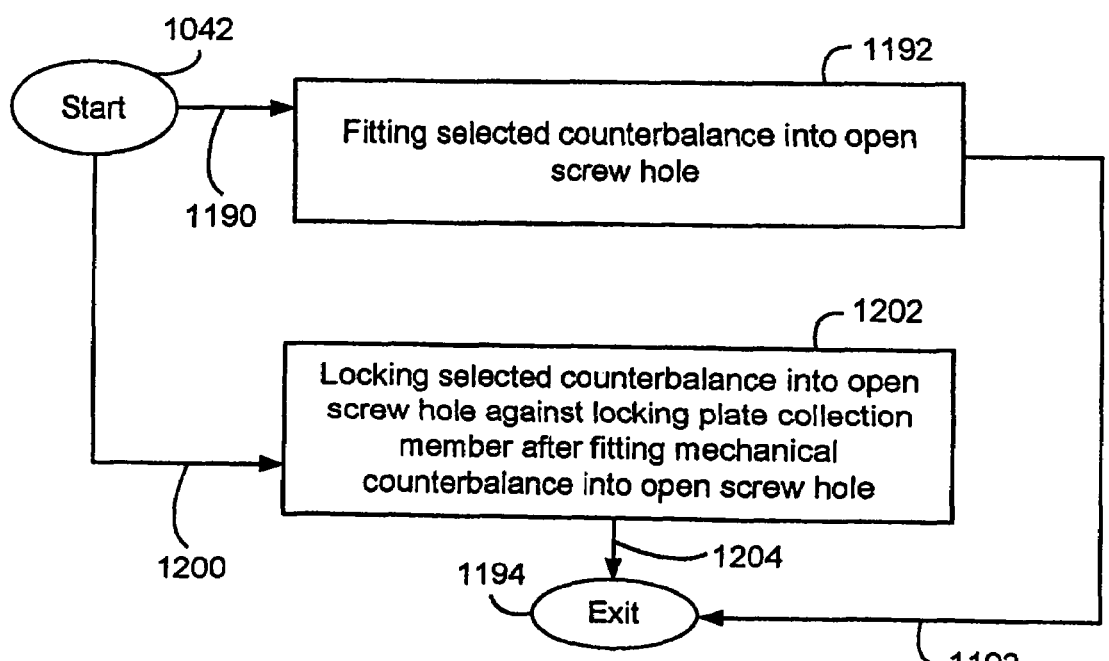
FIG. 11B shows a detail of inserting the selected counterbalance into the open screw hole of FIG. 9B.

FIG. 11B shows a detail of operation 1042 of FIG. 9B. Operation 1192 fits the selected counterbalance 102 into the open screw hole. Operation 1202 locks the selected counterbalance 102 into the open screw hole against a locking plate collection member, after fitting the selected counterbalance into the open screw hole.

Figure 12A:
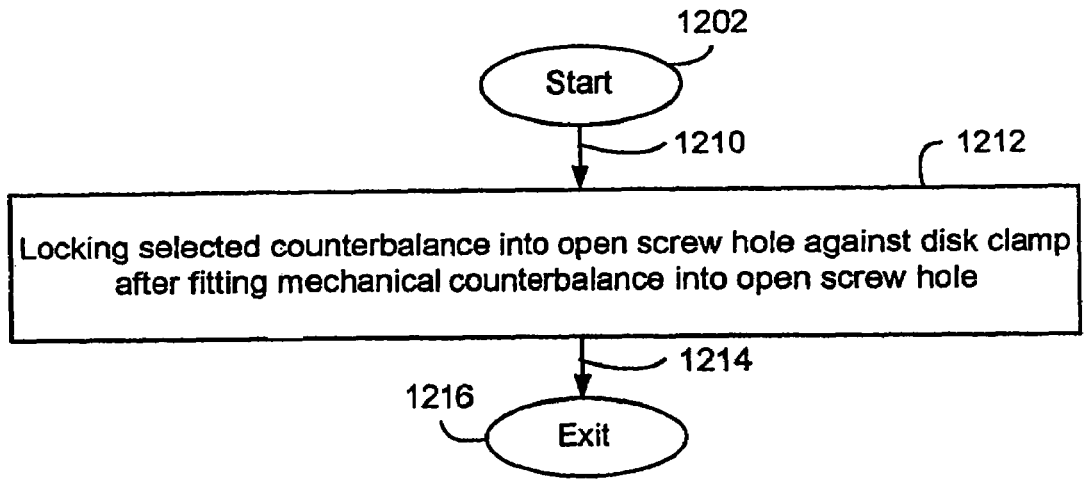
FIG. 12A shows of locking the selected counterbalance into the open screw hole of FIG. 11B.

FIG. 12A shows a detail of operation 1202 of FIG. 11B. Operation 1202 locks the selected counterbalance 102 into the open screw hole against the disk clamp after fitting the selected counterbalance into the open screw hole.

Figure 12B:
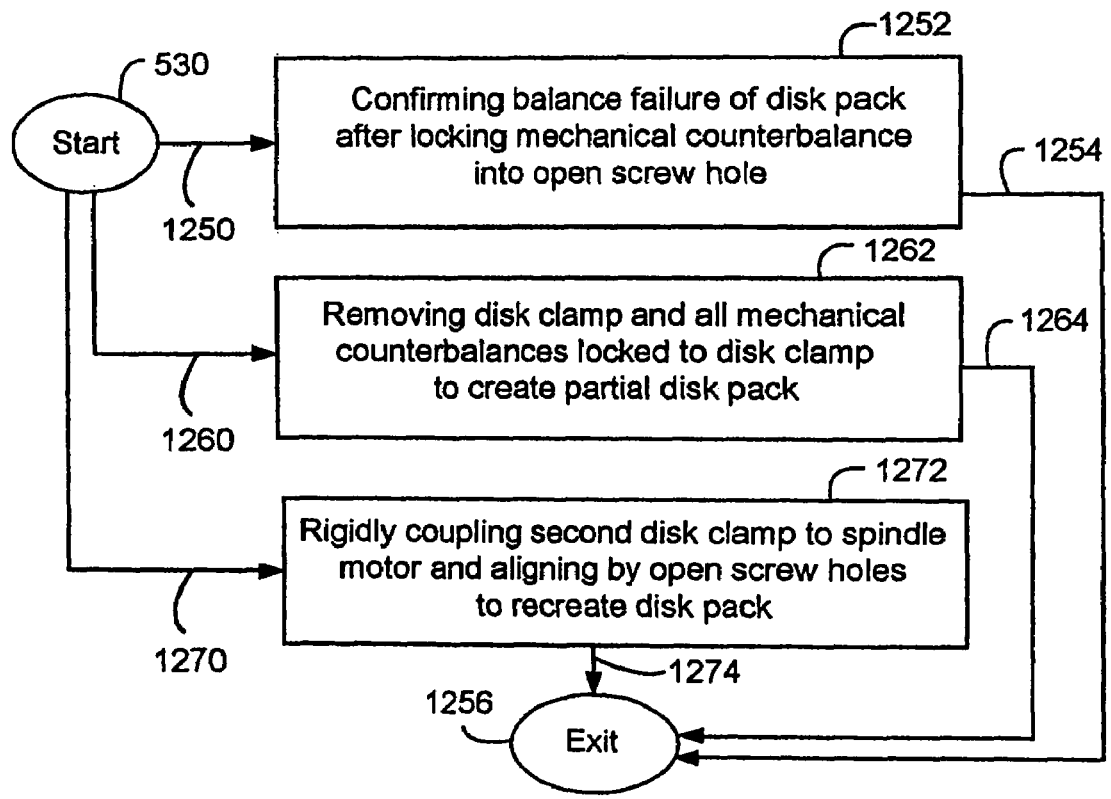
FIG. 12B shows further making the balanced disk pack of FIGS. 8 and 9A.

FIG. 12B shows a detail of program system 530 of FIGS. 8 and 9A providing, if the disk pack fails to balance, disassembly of the disk pack with fitted counterbalances to salvage at least the spindle motor and the disks. This is performed as follows. Operation 1242 confirms a balance failure for the disk pack. Operation 1252 removes the disk clamp, and all of the mechanical counterbalances locked to the disk clamp, from the disk pack to create a partial disk pack. Operation 1262 then rigidly couples a second disk clamp to the spindle motor of the partial disk pack, and aligns it by open screw holes, to recreate the disk pack.

Figure 13A:
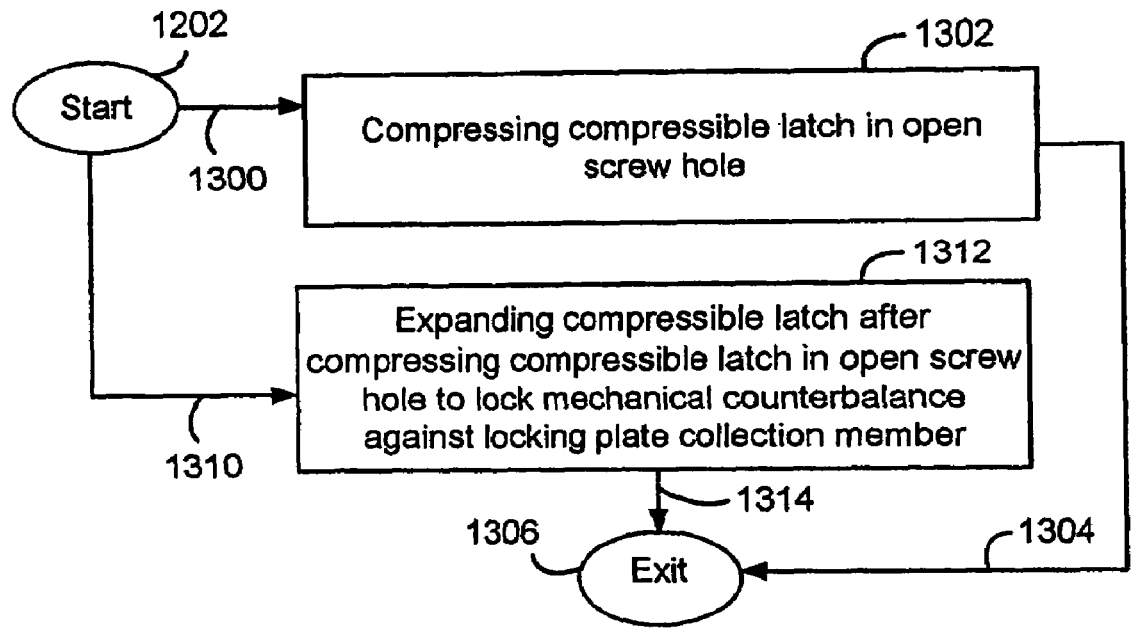
FIG. 13A shows further locking the mechanical counterbalance into the open screw hole of FIG. 11B.

FIG. 13A shows a detail of operation 1202 of FIG. 11B. Operation 1302 compresses a compressible latch into the open screw hole. Operation 1312 expands this latch after compressing it into the open screw hole to lock the mechanical counterbalance against the locking plate collection member.

Figure 13B:
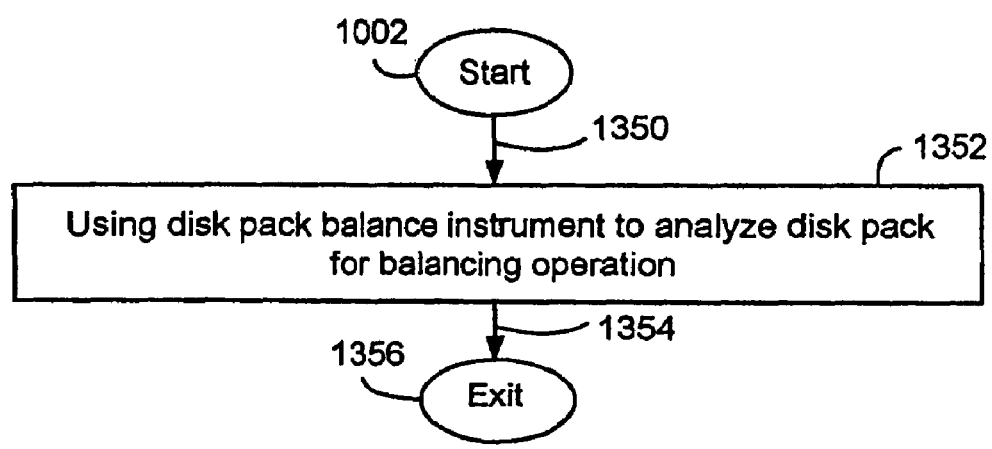
FIG. 13B shows further analyzing the disk pack for the balancing operation for the open screw hole of FIG. 9B.

FIG. 13B shows a detail of operation 1002 of FIG. 9B. Operation 1352 uses a disk pack balance instrument 304 of FIG. 8 to analyze the disk pack 410 for the balancing operation. Hoffman manufactures the preferred disk pack balance instruments.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of making a balanced disk pack, for a hard disk drive, from a disk pack including a spindle motor rigidly coupled, and aligned by at least two open screw holes, with a disk clamp,
   wherein said method comprises, for each of said open screw holes, of the steps of:
   analyzing said disk pack for a balancing operation for said open screw hole;
   performing said balance operation for said open screw hole, further comprising said steps of:
   selecting a mechanical counterbalance, comprising a cylindrical shaft centered around a principal axis and a balance head asymmetric about said principal axis including a concave interior face and a convex exterior face, for said open screw hole to create a selected counterbalance of a total mass, if a balance action is determined for said open screw hole; and inserting said selected counterbalance into said open screw hole until said mechanical counterbalance locks into said open screw hole with said concave interior face locked toward said spindle motor and with said convex exterior face locked away from said spindle motor to at least partially create said balanced disk pack, if said balance action is determined for said open screw hole.

2. The method of claim 1, wherein the step selecting said mechanical counterbalance for said open screw hole further comprising the step of:
   selecting said mechanical counterbalance for said open screw hole from a counterbalance collection and from a counterbalance mass collection to create said selected counterbalance with said total mass;
   wherein said mechanical counterbalance mass collection comprising at least two members;
   wherein said total mass is a member of said mechanical counterbalance mass collection;
   wherein each of said members of said mechanical counterbalance mass collection approximates the total mass of at least one member of said mechanical counterbalance collection; and
   said selected counterbalance is an instance of a member of said mechanical counterbalance collection.

3. The method of claim 1, wherein the step inserting said selected counterbalance into said open screw hole further comprising the steps of:
   fitting said selected counterbalance into said open screw hole with said concave interior face locked toward said spindle motor and with said convex exterior face locked away from said spindle motor; and
   locking said selected counterbalance into said open screw hole against a member of a locking plate collection after fitting said selected counterbalance into said open screw hole;
   wherein said locking plate collection comprising said disk clamp and said spindle motor.

4. The method of claim 3, wherein the step locking said mechanical counterbalance into said open screw hole further comprising the steps of:
   compressing a compressible latch in said open screw hole; and
   expanding said compressible latch after compressing said compressible latch in said open screw hole to lock said mechanical counterbalance against said locking plate collection member.

5. The method of claim 4, wherein said compressible latch includes at least one member of a latch collection comprising a compressible ridge ring, and an M compressible fin ring; wherein M is at least two.

6. The method of claim 5, wherein said locking plate collection further comprising at least one disk spacer.

7. The method of claim 5, wherein the step locking said selected counterbalance into said open screw hole further comprising the step of:
   locking said selected counterbalance into said open screw hole against said disk clamp after fitting said mechanical counterbalance into said open screw hole;
   wherein said method further comprising the steps of:
   confirming a balance failure of said disk pack after locking said mechanical counterbalance;
   removing said disk clamp and all of said mechanical counterbalances locked to said disk clamp to create a partial disk pack; and
   rigidly coupling a second disk clamp to said spindle motor of said partial disk pack, and aligning by said open screw holes, to recreate said disk pack.

8. The method of claim 1, wherein the step analyzing said disk pack for said balancing operation for said open screw hole further comprising the step of:
   using a disk pack balance instrument to analyze said disk pack for said balancing operation.

9. A method of making a hard disk drive, comprising the step of: using said balanced disk pack of claim 8 to create said hard disk drive.

* * * * *